(12) United States Patent  
Zhang et al.

(10) Patent No.: US 10,145,470 B2  
(45) Date of Patent: Dec. 4, 2018

(54) CVT CONTROL DURING CHANGE-OF-MIND SHIFTS

(71) Applicant: GM GLOBAL TECHNOLOGY OPERATIONS LLC, Detroit, MI (US)

(72) Inventors: Zhen J. Zhang, West Bloomfield, MI (US); Paul G. Otanez, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 508 days.

(21) Appl. No.: 15/019,463

(22) Filed: Feb. 9, 2016

(65) Prior Publication Data

US 2017/0227120 A1 Aug. 10, 2017

(51) Int. Cl.
*F16H 61/662* (2006.01)

(52) U.S. Cl.
CPC .................................. *F16H 61/662* (2013.01)

(58) Field of Classification Search
CPC . F16H 2061/66213; F16H 2061/66204; F16H 61/662; F16H 61/66227; F16H 61/66231; F16H 61/66236; F16H 61/6625; F16H 61/66254; F16H 61/66259; B60W 10/107
See application file for complete search history.

(56) References Cited

U.S. PATENT DOCUMENTS

| 8,323,150 | B2 | 12/2012 | Atmaram et al. |
| 8,944,957 | B2 * | 2/2015 | Atmaram ................ F16H 61/06 477/115 |
| 9,169,927 | B2 * | 10/2015 | Nakamura ........ F16H 61/66259 |
| 9,869,387 | B2 * | 1/2018 | Monajemi ............. F16H 61/061 |
| 2014/0297142 | A1 | 10/2014 | Kojima et al. |

FOREIGN PATENT DOCUMENTS

JP 2015137719 A 7/2015

* cited by examiner

*Primary Examiner* — Erin D Bishop
(74) *Attorney, Agent, or Firm* — Quinn IP Law

(57) ABSTRACT

A continuously variable transmission (CVT) for use with a torque generating mechanism includes an input member connectable to the torque generating mechanism, an output member, a variator assembly, and a controller. The controller is programmed to control a change-of-mind shift of the CVT requesting a transition from an initially-requested shift to a next-requested shift before completion of the initially-requested shift. Additionally, the controller is programmed to execute a method by detecting the change-of-mind shift, determining an acceleration profile of the input member for the change-of-mind shift using a calibration map indexed by a starting and target ratio of the variator assembly, and calculating a required ratio of the input and output pulleys using the acceleration profile. The controller then commands a clamping pressure of the variator assembly to thereby achieve the calculated required ratio. A vehicle includes an engine and the CVT noted above.

19 Claims, 4 Drawing Sheets

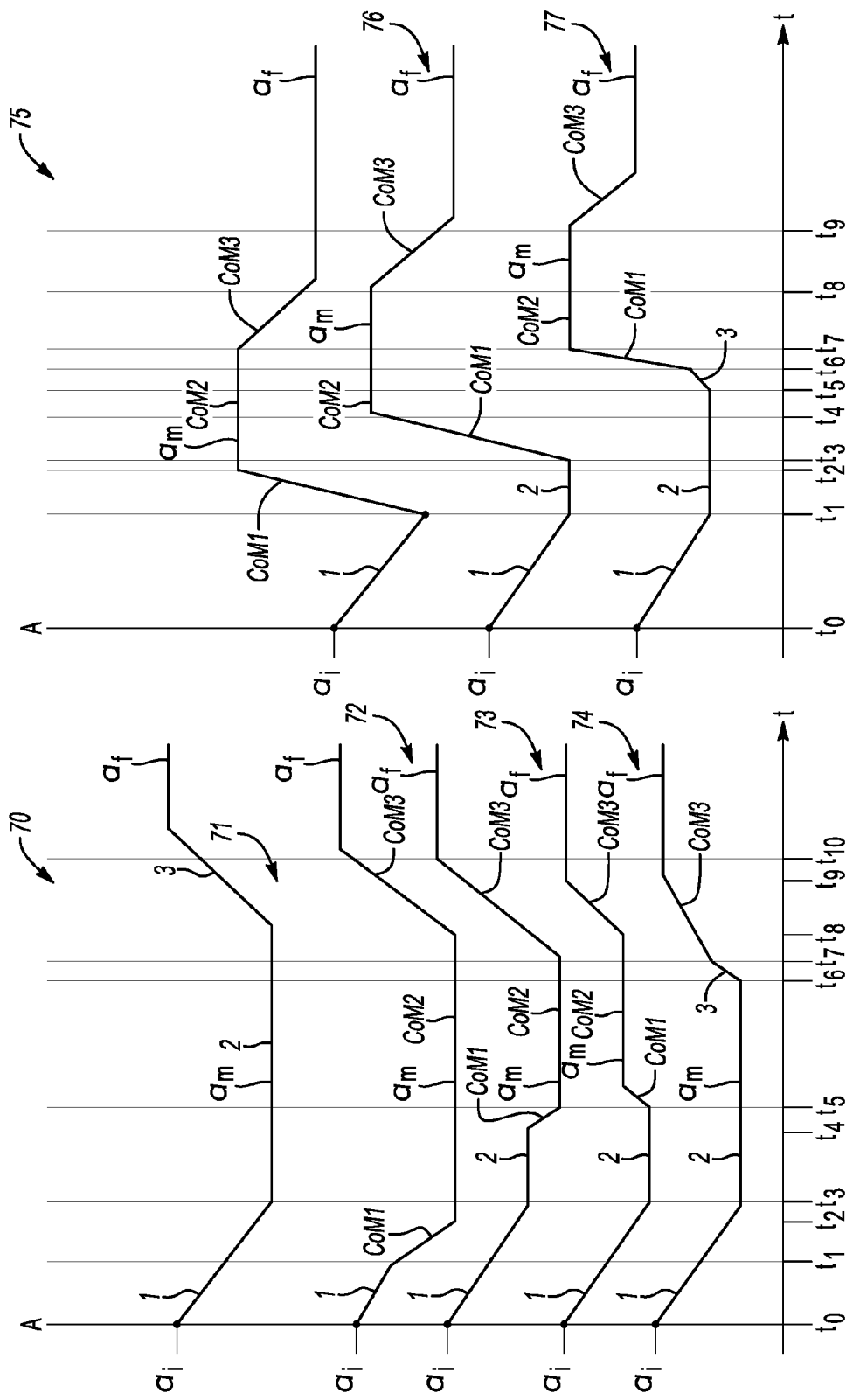

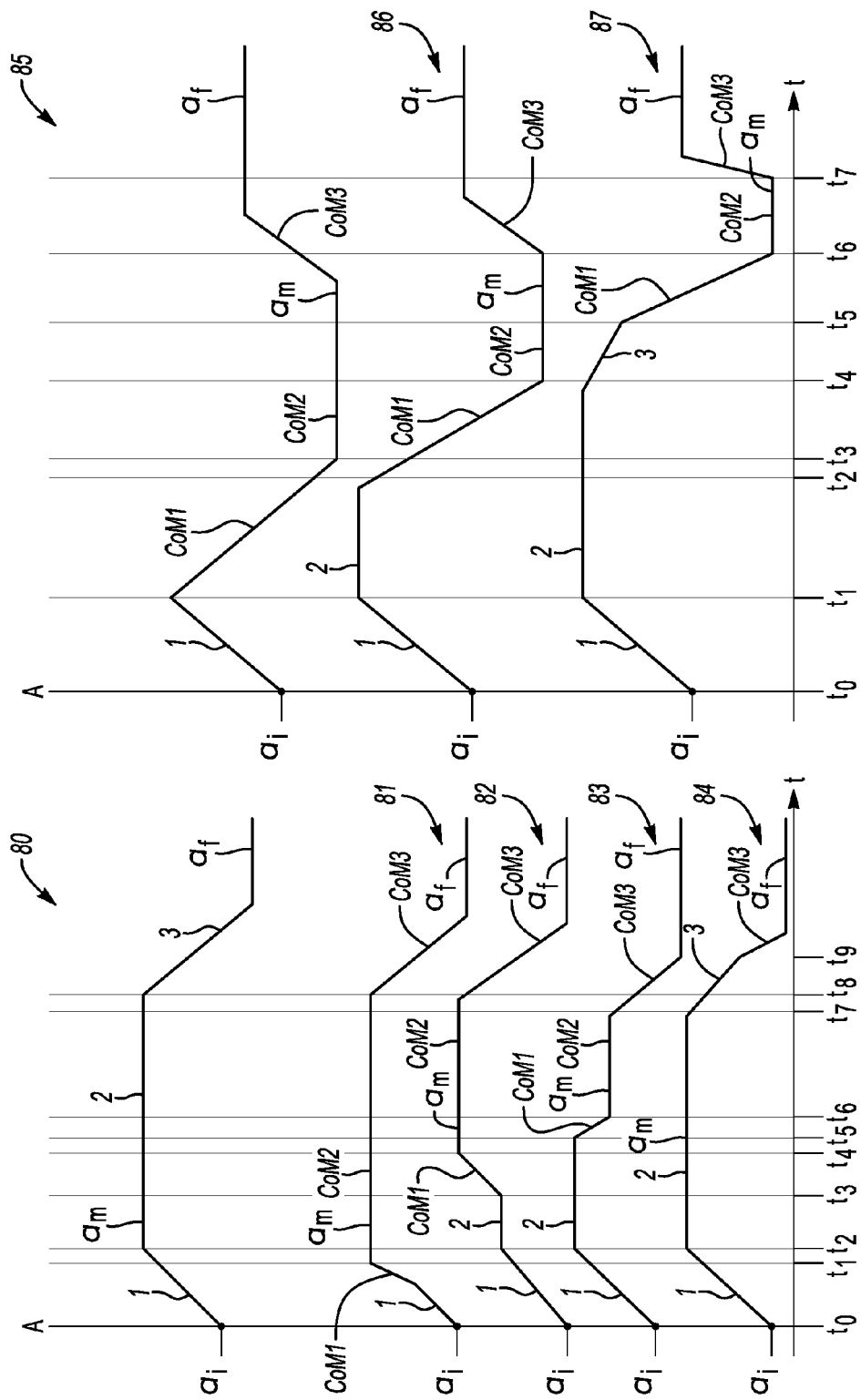

US 10,145,470 B2

CVT CONTROL DURING CHANGE-OF-MIND SHIFTS

TECHNICAL FIELD

The present disclosure relates to the control of a continuously variable transmission during change-of-mind shifts.

BACKGROUND

A continuously variable transmission or CVT is a type of power transmission that is capable of infinite variability within a calibrated range of speed or torque ratios. Unlike conventionally-geared transmissions, which use a torque converter, planetary gear sets, and multiple friction clutches to establish a desired gear state, a CVT instead uses a variable-diameter pulley system. The variable-diameter pulley system, commonly referred to as a variator assembly, can transition anywhere within the calibrated range of ratios via adjustment of an applied pulley clamping pressure.

A typical variator assembly includes two variator pulleys interconnected via an endless rotatable drive element such as a drive chain or belt. The drive element rides within a variable-width gap defined by conical pulley faces. One of the variator pulleys receives input torque from a torque generating device, typically an engine via a turbine and an input gear set. The input pulley thus acts as a driving/primary pulley. The other variator pulley is connected via one or more additional gear sets to an output shaft of the CVT and thus acts as a driven/secondary pulley. Additional gear sets may be used on the input or output sides of the variator assembly depending on the configuration.

In order to vary the CVT speed or torque ratio, the clamping force noted above is applied to the variator pulleys using one or more pulley actuators. The clamping force effectively squeezes the pulley halves together in order to change the width of the gap between adjacent pulley faces. Variation in gap size, i.e., the pitch radius, causes the rotatable drive element to ride higher or lower within the gap as needed. This in turn changes the effective diameters of the variator pulleys and ultimately varies the speed or torque ratio of the CVT.

SUMMARY

A continuously variable transmission (CVT) is disclosed herein for use with a torque generating mechanism, such as but not necessarily limited to an internal combustion engine. The CVT that includes a rotatable input member that is connectable to the torque generating mechanism, an output member, a variator assembly, and a controller. The controller is programmed as set forth herein to control change-of-mind shifts of the CVT, i.e., a request to transition from an initially-requested shift to a next-requested shift before completion of the initially-requested shift.

More particularly, the controller is programmed to detect a requested change-of-mind shift, determine a required acceleration profile of the turbine or other input member for the change-of-mind shift using a calibration map that is referenced or indexed by a starting ratio and a target ratio of the variator assembly, and calculate a required speed or torque ratio of the input and output pulleys using the acceleration profile. The controller then commands a clamping pressure of the variator assembly to thereby achieve the calculated required ratio.

The controller may include a torque request module embodied as a combined hardware/software block. The torque request module is operable for requesting a required level of output torque from an engine or other prime mover. In order to control the CVT ratio during the change-of-mind shift, the input acceleration profile is blended with the torque management profile as needed to create an acceleration profile suitable for the change-of-mind shift.

In general, the controller uses variables extracted from the calibration map to build an optimal input acceleration profile for the input member during the detected change-of-mind shift, and then converts the input acceleration profile into a speed or torque ratio of the CVT. The CVT ratio, or more precisely a rate of change thereof, is then achieved via control of the clamping pressure command that is ultimately transmitted to actuators of the variator assembly. For acceleration profile shaping, the controller may use the current/actual CVT ratio as a starting ratio and a desired ratio as the target ratio, and then build the input acceleration profile from the data in the calibration map. Alternatively, the controller may use a different ratio as the starting ratio.

The allotted time for completing various stages of the input acceleration profile may also be automatically modified relative to the times required for completing the initially-requested shift. Additionally, the input acceleration profile may be automatically delayed for a sufficient amount of time needed to achieve synchronization with engine torque management. For a stacked shift in particular, i.e., a stacked upshift, stacked downshift, power downshift-to-coasting downshift, or coasting downshift-to-power downshift, and also for change-of-direction shifts such as an upshift-to-downshift or a downshift-to-upshift, the controller uses the current acceleration profile value as an initial value for the next acceleration profile to use in the change-of-mind shift.

The initial-to-maximum time duration for completing the change-of-mind shift can be modified based on the direction of the shift. For an initial step shift, for instance, the controller may use the current input speed acceleration as the initial value for the input speed acceleration profile. Additionally, the profile's initial-to-maximum time duration is modified based on the current input acceleration. If the current input acceleration has the same sign as the profile of the next-requested shift, the initial time is shortened or reduced relative to the initial time used in a regular step shift using a calibration value. If the current input speed acceleration has a different sign relative to the profile of the next-requested shift, the initial time is lengthened by another calibration value.

A method of controlling the CVT during the change-of-mind shift is also disclosed. In a particular embodiment, the method includes detecting a change-of-mind shift of the CVT and then determining a required acceleration profile of the input member for the change-of-mind shift using a calibration map indexed by a starting and target ratio of the variator assembly. The method also includes calculating a required ratio of the input and output pulleys using the acceleration profile, and ultimately commanding a clamping pressure of the variator assembly to thereby achieve the calculated required ratio.

A vehicle is also disclosed herein that includes an engine and the CVT noted above.

The above features and other features and advantages of the present disclosure are readily apparent from the following detailed description of the best modes for carrying out the disclosure when taken in connection with the accompanying drawings.

BRIEF DESCRIPTION OF THE DRAWINGS

FIG. 3 is a time plot of various CVT input acceleration profiles usable by the controller of FIG. 1 in controlling an example stacked upshift change-of-mind shift maneuver.

FIG. 4 is a time plot of various CVT input speed acceleration profiles usable by the controller of FIG. 1 in controlling an example upshift-to-downshift change-of-mind shift maneuver.

FIG. 5 is a time plot of various CVT input speed acceleration profiles usable by the controller of FIG. 1 in controlling an example stacked downshift change-of-mind shift maneuver.

FIG. 6 is a time plot of various CVT input speed acceleration profiles usable by the controller of FIG. 1 in controlling an example downshift-to-upshift change-of-mind shift maneuver

DETAILED DESCRIPTION

Figure 1:
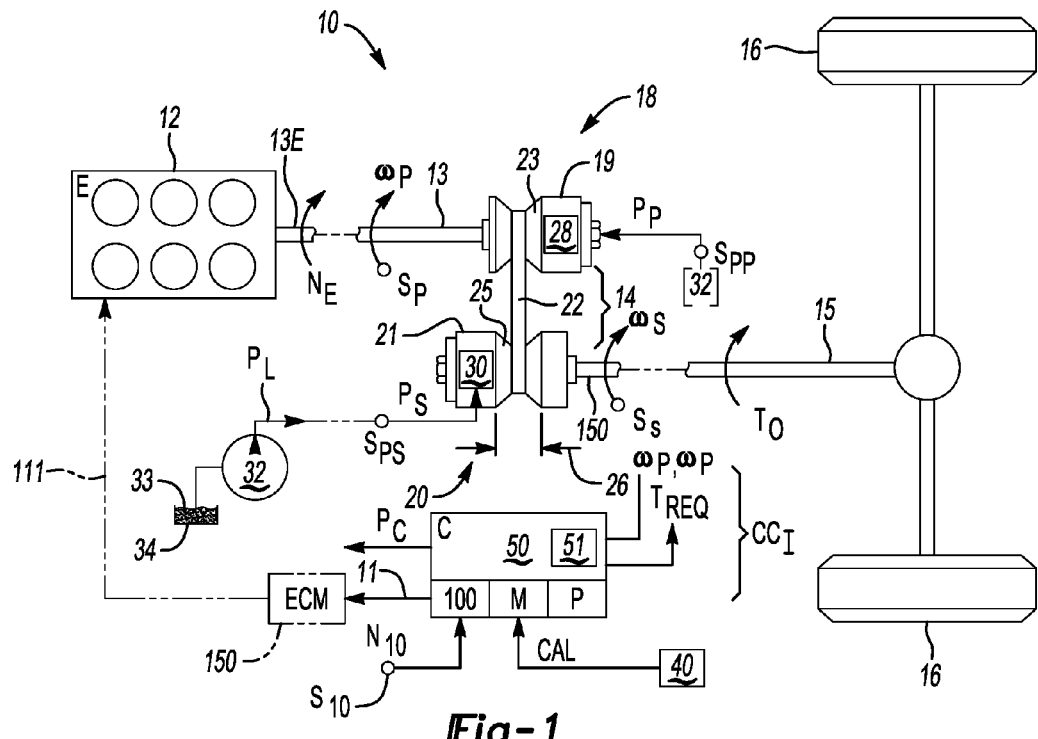
FIG. 1 is a schematic illustration of an example system having a continuously variable transmission (CVT) and a controller programmed to control change-of-mind shift maneuvers of the CVT as set forth herein.

Referring to the drawings, wherein like reference numbers correspond to like or similar components throughout the several figures, and beginning with FIG. 1, an example system 10 is shown that includes a continuously variable transmission (CVT) 14 and a controller (C) 50. The system 10 will be referred to hereinafter as a vehicle 10 for illustrative consistency. However, the system 10 may be alternatively configured as any mobile or stationary platform or other system in which torque from a torque generating device 12, is ultimately used to conduct useful work, e.g., a power plant or robotic system.

The controller 50 is programmed to automatically control change-of-mind shift maneuvers in which a requested shift or transition of the CVT 14 to a given ratio initiates before the completion of a prior-requested shift or transition. Example change-of-mind shifts include multiple sequential or "stacked" upshifts, stacked downshifts, an upshift-to-downshift maneuver, and a downshift-to-upshift maneuver, all of which are illustrated in FIGS. 3-6 and described below with further reference to a baseline upshift maneuver of FIG. 2 and an example method 100 shown in FIG. 7.

The torque generating device 12 is shown as an example internal combustion engine (E), but may be embodied as an electric machine or other device operable for generating output torque. For illustrative consistency, the torque generating device 12 will be described hereinafter as an engine 12 without limiting the scope to such a design. The engine 12 includes an output member 13E that rotates at engine speed (arrow NE). A hydrodynamic torque converter assembly and gear set (not shown) may connect the output member 13E to the CVT 14 in some embodiments.

The CVT 14 is embodied as or includes a variator assembly having primary and secondary variator pulleys 18 and 20. The variator pulleys 18 and 20 have respective primary and secondary pulley speeds $\omega_P$ and $\omega_S$ that are measurable via respective speed sensors $S_P$ and $S_S$, with the variator pulleys 18 and 20 being responsive to clamping pressure signal (arrow $P_C$) transmitted by the controller 50 in order to change a speed ratio ($R_{SR}$) of the CVT 14, i.e., $$R_{SR} = \frac{\omega_S}{\omega_P}.$$

Alternatively, sensors could be located in other locations and configurations, as long as the speeds of the variator pulleys 18 and 20 can be derived, e.g., rotational speeds of drive wheels 16 of the vehicle 10 could be measured and used in place of the secondary speed sensor $S_S$.

With respect to the example vehicle 10 of FIG. 1, the output member 13E is ultimately connected to an input member 13 of the CVT 14. An output member 15 connected to the CVT 14, either directly or via an additional gear set, ultimately delivers output torque (arrow $T_O$) to the drive wheels 16. The CVT 14 includes the primary variator pulley 18, which is connected to and ultimately driven by the output member 13E, the secondary variator pulley 20 which includes an output member 150 that is connected to the output member 15 via one or more gear sets (not shown), and a continuous rotating drive element 22, i.e., any closed/endless loop of rubber and/or metal such as a chain or belt that is suitable for transmitting torque from the primary variator pulley 18 to the secondary variator pulley 20. The variator pulleys 18 and 20, along with the drive element 22, constitute a variator assembly of the CVT 14.

The primary and secondary variator pulleys 18 and 20 each have mating pulley halves 19 and 21, respectively, with respective conical faces 23 and 25 defining a variable-width gap 26. The drive element 22 positioned within the variable-width gap 26 rides on the conical faces 23 and 25 as the engine 12 powers the primary pulley 18 at the input speed/primary speed ($\omega_P$) of the primary pulley 18. The secondary pulley 20 rotates at the secondary speed ($\omega_S$). As noted above, both pulley speeds ($\omega_P$, $\omega_S$) may be measured via the sensors $S_P$ and $S_S$ and reported to the controller 50, for instance as signals over a controller area network or other suitable channels.

The width of the variable-width gap 26 may be varied via movement of the mating halves 19 and/or 21 so as to change the current ratio of the CVT 14. Therefore, the vehicle 10 includes respective first and second variator actuators 28 and 30, shown schematically in FIG. 1, each responsive to primary and secondary clamping pressures (arrows $P_P$ and $P_S$ respectively) commanded by the clamping pressure signal (arrow $P_C$) and individually measurable via corresponding pulley pressure sensors ($S_{PP}$, $S_{PS}$) to change the relative position of the respective primary and secondary pulleys 18 and 20. A spring (not shown) can be included within each of the variator pulleys 18 and 20. An example embodiment of the first and second actuators 28 and 30 includes a hydraulic piston/cylinder system, although other linear actuators may be used such as electromechanical devices or pneumatic pistons.

The first variator actuator 28 acts on a moveable one of the mating halves 19 of the primary variator pulley 18 in response to application of the primary clamping pressure (arrow $P_P$). Likewise, the second variator actuator 30 acts on a moveable one of the mating halves 21 of the secondary variator pulley 20 in response to the secondary clamping pressure (arrow $P_S$). Line pressure (arrow $P_L$) may be provided to the CVT 14 via a fluid pump 32, with the fluid pump 32 drawing fluid 33 such as oil from a sump 34 and circulating the fluid 33 to the CVT 14 via channels, hoses, fittings, and other suitable conduit (not shown). In a possible embodiment, the primary and secondary clamping pressures (arrows $P_P$ and $P_S$, respectively) are independent of line pressure (arrow $P_L$). However, line pressure (arrow $P_L$) may be equal to secondary clamping pressure ($P_S$) in other embodiments.

The controller 50 may be configured as one or more computer devices having memory (M). The controller 50 may include hardware elements such as a processor (P), circuitry including but not limited to a timer, oscillator, analog-to-digital circuitry, digital-to-analog circuitry, proportional-integral-derivative control logic, a digital signal processor, and any necessary input/output devices and other signal conditioning and/or buffer circuitry. The memory (M) may include tangible, non-transitory memory such as read only memory, e.g., magnetic, solid-state/flash, and/or optical memory, as well as sufficient amounts of random access memory, electrically-erasable programmable read-only memory, and the like.

The controller 50, which is in communication with the first and second variator actuators 28 and 30, receives a set of control input signals (arrow $CC_I$) as part of the method 100. The control input signals (arrow $CC_I$) may include, but are not limited to, ground speed $N_{10}$ as reported, calculated, or measured by one or more speed sensors $S_{10}$, the pulley speeds ($\omega_P$ and $\omega_S$), and a driver requested torque (arrow $T_{REQ}$). As is known in the art, the driver requested torque (arrow $T_{REQ}$) is typically determined by actions of a driver of the vehicle 10, such as via the present throttle request, braking levels, gear state, and the like.

The controller 50 also is programmed with a calibration map (CAL) 40. The calibration map 40 is indexed or referenced by an initial or a starting CVT ratio for the change-of-mind shift and a final/target ratio to reach at the end of the change-of-mind shift, and is populated with the corresponding profile parameters needed for building the required input acceleration profile. For instance, the calibration map 40 may be populated with three time values and at least two acceleration values collectively defining the trajectories and overall shape of the acceleration profile. Three acceleration values may be used as explained below, with initial acceleration of the input member 13 for the initially-requested shift being one of the acceleration values, or two acceleration values may be used when the initial acceleration is measured or calculated. Trajectories of the input acceleration profile used in the control of the CVT 14 in the execution of the method 100 are therefore determined by the data extracted from the calibration map 40. Example input acceleration profiles are described below with particular reference to FIGS. 3-6.

As part of the method 100, the controller 50 may also request a particular level of torque from the engine 12, e.g., by transmitting an engine torque request signal (arrow 11) from the torque request module 51 to an engine control module (ECM) 150. The ECM 150 may respond by transmitting an engine control signal (arrow 111) to the engine 12 to achieve the requested output torque. Similarly, engine speed management can be used to control engine speed to achieve the required ratio between the variator pulleys 18 and 20. Blending with any torque management profile is also part of the scope of the method 100, as will now be described beginning with FIG. 2.

The method 100 is used to manage input acceleration and torque management to produce optimal change-of-mind shifts. As part of the method 100, the controller 50 determines the commanded speed or torque ratio trajectory as a function of a desired acceleration profile using the calibration map 40 of FIG. 1. Close coordination with torque management considers the expected inertia torque experienced during some change-of-mind shifts based on initial and target speed ratios, and also considers any communications delay in a controller area network bus (not shown) in a response from the engine 12 so as to properly blend or synchronize such events during the change-of-mind shift.

Figure 2:
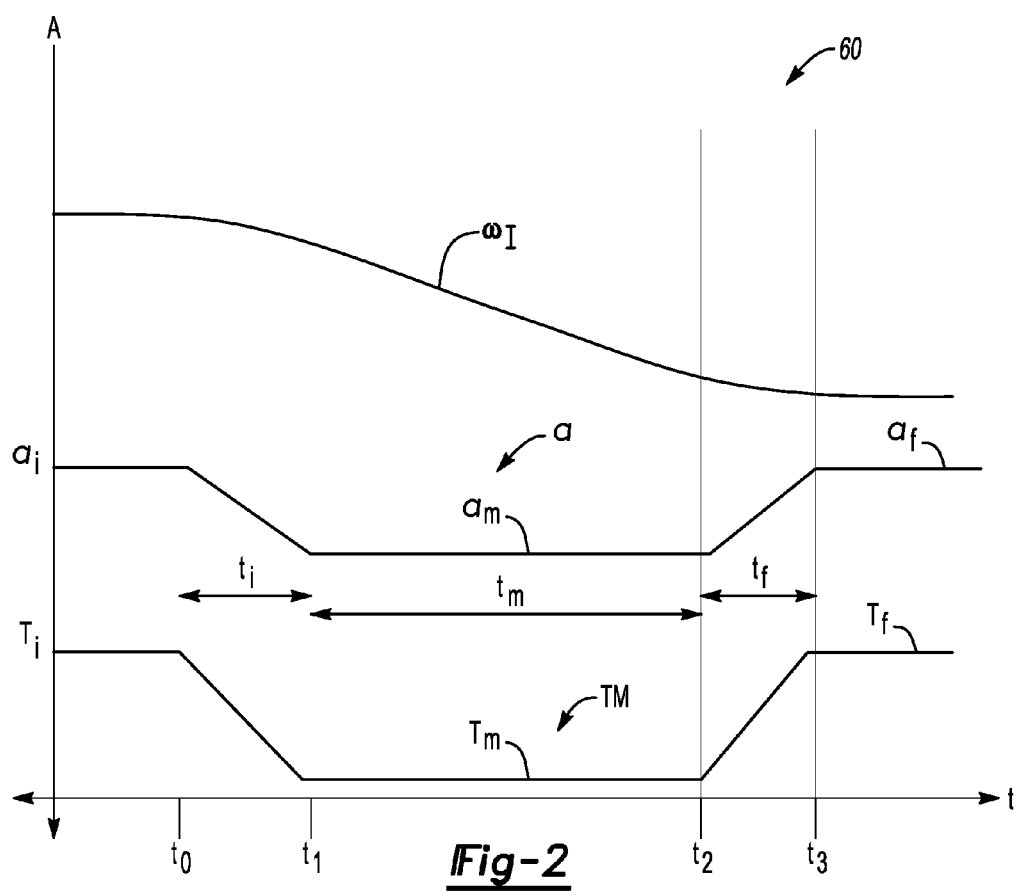
FIG. 2 is a time plot of CVT input speed, acceleration, and input torque management, with amplitude plotted on the vertical axis and time plotted on the horizontal axis.

As shown in FIG. 2, the variator input speed (trace $\omega_I$) and the input acceleration (traces a), as well as torque management (trace TM) from the engine 12, are depicted as a set of traces 60 for an example step upshift of the CVT 14 of FIG. 1. Time (t) is plotted on the horizontal axis and nominal amplitude (A) is plotted on the vertical axis. That is, the traces for variator input speed (trace $\omega_I$), e.g., the primary speed cop noted above, acceleration (trace a), and torque management (trace TM) are shown at different amplitudes (A) solely for illustrative clarity. The actual amplitudes in FIG. 2 may or may not vary with respect to each other, and are not intended to indicate relative values.

When a desired speed ratio of the CVT 14 has a discrete positive increase indicative of a step upshift, the input speed (trace $\omega_I$) to the CVT 14 decreases, with the input speed (trace $\omega_I$) being the same as or determine from the primary speed (trace $\omega_P$) of FIG. 1. The associated acceleration of the input member 13 results in an inertia torque from the engine 12 which, if not properly managed, can produce an output torque disturbance. Therefore, in order to produce smooth and rapid change-of-mind shifts, torque management (trace TM) may be used to compensate for such inertia torque. The amount of torque management (trace TM), shown as initial torque ($T_i$), maximum torque ($T_i$), and final torque ($T_m$), is a calibration value that is related to the input acceleration ($a_i$), as is known in the art. Thus, in the various examples that follow in FIGS. 3-6, the control of the CVT speed ratio of the CVT 14 may be closely coordinated with torque management for certain change-of-mind shift maneuvers.

The initial acceleration ($a_i$) represents the acceleration of an input member 13 to the CVT 14, e.g., a turbine or a rotating member connected to a turbine via a gear set, at the onset of an initial shift maneuver. Likewise, the value $a_m$ represents a maximum acceleration to be attained, and the value $a_f$ represents a final acceleration upon completing the change-of-mind shift. With respect to the required time parameters describing the required trajectories of the acceleration profile as part of method 100, $t_1$ is the time between commencement of acceleration of the input member 13 at time $t_0$ and a maximum calibrated input acceleration ($a_m$) achieved at a later time $t_1$, and $t_m$ is the maximum time or duration of acceleration of the input member 13, i.e., the duration $t_2$-$t_1$. The time duration between ending the maximum acceleration ($a_m$) and attaining the final acceleration ($a_f$) is indicated by $t_f$ i.e., the duration $t_3$-$t_2$. Thus, the values $a_i$, $a_m$, $a_f$, $t_i$, $t_m$, and $t_f$ are six distinct calibration values that may be recorded in the calibration map 40 of FIG. 1. The input speed ($\omega_I$) may be optionally measured as opposed to being provided via a calibration or calculation, in which case the number of required calibrations is five rather than six.

The trajectories of the acceleration profile from the calibration map 40 enables calculation of the required CVT ratio, which may be represented as:

$$R_{SR} = \frac{\omega_S}{\omega_P}$$

The time derivative of the speed ratio $R_{SR}$ may be expressed as:

$$\dot{R}_{SR} = \frac{1}{\omega_P}\dot{\omega}_S - \frac{\omega_S}{\omega_P^2}\dot{\omega}_P$$

The acceleration of the input pulley 18 may then be determined as follows:

$$\dot{\omega}_P = \frac{\omega_P}{\omega_S}\dot{\omega}_S - \frac{\omega_P^2}{\omega_S}\dot{R}_{SR}$$

Or, stated in terms of the CVT speed ratio:

$$\dot{\omega}_P = \frac{1}{R_{SR}}\dot{\omega}_S - \frac{\omega_P}{R_{SR}}\dot{R}_{SR}$$

In all of the above-noted equations, the subscripts P and S continue to represent the primary and secondary pulleys, respectively. The above equations could be alternatively expressed as a torque ratio, i.e., $$R_{TR} = \frac{\omega_P}{\omega_S}.$$

In such an example, the rate of change of the torque ratio may be expressed as:

$$\dot{R}_{TR} = -\frac{\omega_P^2}{\omega_S^2}\dot{R}_{SR}, \text{ or } \dot{R}_{TR} = -\frac{1}{R_{SR}^2}\dot{R}_{SR}$$

FIGS. 3-6 collectively depict acceleration profile traces illustrating different example change-of-mind shifts of the CVT 14 shown in FIG. 1. All amplitudes (A) are once again nominal, not relative, between traces 70-74 of FIG. 3, traces 75-77 of FIG. 4, traces 80-84 of FIG. 5, and traces 85-87 of FIG. 7. With respect to FIG. 3, trace 70 represents a step upshift similar to that depicted in FIG. 2 and described above. Trace 70 forms the baseline profile for shaping the trajectories of change-of-mind shifts initiated during the baseline upshift.

For a step upshift, the shift progresses in three distinct phases, which are labeled as 1, 2, and 3 for trace 70. Starting with an initial acceleration $a_i$ at time $t_0$, an operator requests an increase in the speed ratio or torque ratio, e.g., via the torque request ($T_{REQ}$) of FIG. 1. As a result, the input member 13 accelerates, i.e., changes speed in a particular direction, from the level of the initial acceleration $a_i$ to the maximum of $a_m$ at a calibrated trajectory, i.e., over the interval $t_i = (t_2 - t_0)$. As the speed of the input member 15 decreases with a constant acceleration, the maximum acceleration $a_m$ is held for a calibrated duration $t_m = (t_8 - t_2)$ before again changing to the final acceleration $a_f$ over time $t_f = (t_9 - t_8)$. By comparison, in a baseline upshift $t_i = (t_3 - t_0)$, $t_m = (t_8 - t_3)$, and $t_f = (t_{10} - t_8)$.

Trace 70 is therefore a normal or expected trajectory for an upshift. However, various changes-of-mind may occur during the execution of the upshift, any of which may initiate during any of the shift phases 1, 2, or 3. For any change-of-mind shift, therefore, the controller 50 extracts from the calibration map 40 of FIG. 1 the data required for building the optimal input acceleration profile, i.e., the initial, final, and maximum accelerations $a_i$, $a_m$, and $a_f$, as well as the intervals of time $t_i$, $t_m$, and $t_f$, for a total of five or six parameters depending on whether or not the initial acceleration $a_i$ is measured.

Traces 71-74 of FIG. 3 represent an example step-stacked upshift. Trace 71 illustrates maintenance of phase (1) of the initially-requested upshift until about $t_1$, at which point a change-of-mind shift to a different speed ratio is detected before completion of the initial shift. As a result, phase (2) of trace 70 is not entered. Instead, a new shift phase labeled as CoM1 (change-of-mind 1) commences at $t_1$ and ramps at a new trajectory determined by the controller 50 using the calibration map 40. As a result, a new maximum acceleration ($a_m$) is attained that is different than that of the original phase (2). This new second phase (CoM2) is then sustained until $t_8$, at which point the shift completes in a new third phase (CoM3). The third phase (CoM3) ramps up over a duration $t_f = (t_{10} - t_8)$ at a calibrated rate as determined via the calibration map 40.

Traces 72-74 depict different possible shifts and the resultant acceleration profiles using the method 100. For instance, trace 72 sustains the original shift phase (1) until its completion at $t_3$, which is the same as trace 70. Then, the original shift phase (2) initiates until a change-of-mind shift is detected at about $t_4$. The new shift phase (CoM1) commences with a calibrated trajectory, reaching a maximum acceleration $a_m$ different than that of the initial phase (2) of trace 70, i.e., one that is suitable for the requested second shift at a shift phase (CoM2). After a calibrated duration of $t_m = (t_7 - t_5)$, the acceleration profile may enter another phase (CoM3) at $t_7$, ramping up to the final acceleration $a_f$ by $t_{10}$ at a calibrated rate as determined by the calibration map 40. Trace 73 is a slightly different version of trace 72 in which the maximum acceleration ($a_m$) is higher for the second shift than it is for the initially-requested shift, i.e., the opposite of trace 72 where the maximum for the second shift in shift phase (CoM2) exceeds that of the original second phase (2). Trace 74 sees a change-of-mind occurring at $t_7$ after commencement of the original third phase (3), with acceleration ramping up over $t_f = (t_9 - t_7)$ at a calibrated rate as determined by the calibration map 40.

FIG. 4 depicts an example step-up-to-step-down shift, again relative to trace 70. A change-of-mind occurs at $t_1$ requiring a downshift, with the opposite effect on the trajectory relative to trace 70 of FIG. 3. That is, during a downshift the input member 13 accelerates in a positive direction such that the maximum acceleration ($a_m$) is reached during shift phase (CoM2) and exceeds the initial acceleration $a_i$. Time $t_7$ and the trajectory of shift phase (CoM3) as determined from the calibration maps 40 of FIG. 1 provide the remainder of the data needed for building the acceleration profile of trace 75. Likewise, trace 76 illustrates initiation of a downshift at a later time relative to trace 75, while trace 77 depicts a change-of-mind shift commencing just after initiation of the third phase (3) of the initially-requested upshift of trace 70.

FIGS. 5 and 6 depict a step-stacked downshift and a step down-to-step up shift maneuver, respectively. Trace 80 is the inverse of trace 70 of FIG. 3, with acceleration occurring in the positive direction relative to initial acceleration $a_i$, reaching maximum acceleration $a_m$, then decelerating commencing at $t_8$. Traces 81-84 of FIG. 5 depict change-of-mind shifts commencing at different points in time, i.e., during initial phase (1) of trace 81, during initial phase (2) of traces 82 and 83, and during initial phase (3) of trace 84. Likewise, trace 85 of FIG. 6 depicts a change-of-mind shift initiating in initial phase 1 (1), while traces 86 and 87 depict a change-of-mind shift initiating at initial phases (2) and (3), respectively.

Figure 7:
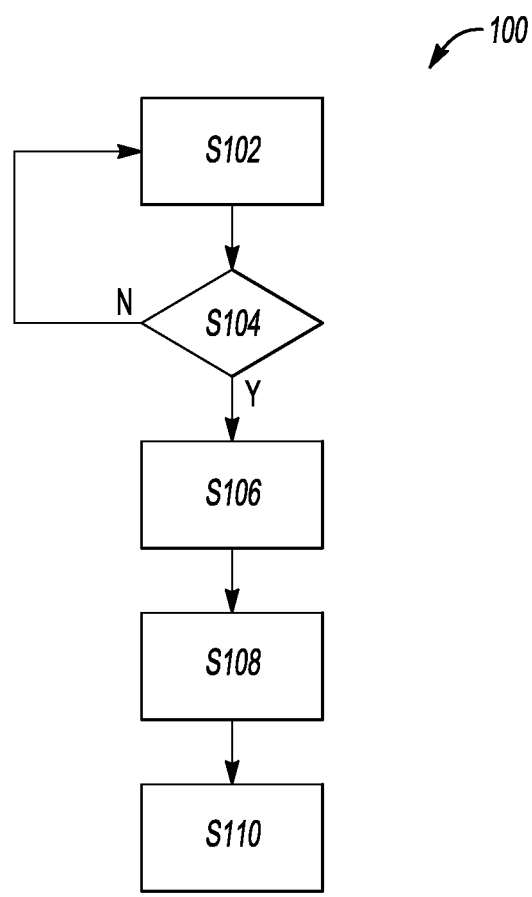
FIG. 7 is a flow chart describing an example method of controlling the CVT of FIG. 1 during any of the example change-of-mind shift maneuvers depicted in FIGS. 3-6.

A method 100 for building and applying the example shift trajectories of FIGS. 3-6 will now be described with reference to FIG. 7. Beginning with step S102, the controller 50, during execution of a requested shift of the CVT 14, receives the control input signals (arrow CC$_I$) shown in FIG. 1. The method 100 proceeds to step S104 while the controller 50 processes the control input signals (arrow CC$_I$).

At step S104, the controller 50 next detects a change-of-mind shift of the CVT 14, which as used herein is any requested transition from an initially-requested shift to a next-requested shift before completion of the initially-requested shift. That is, while in the process of executing the initially-requested shift of step S102, the controller 50 determines whether the control input signals (arrow CC$_I$) are indicative of another shift request, regardless of whether such a change-of-mind shift request is operator-generated or generated in logic of the controller 50. The method 100 proceeds to step S106.

Step S106 entails determining a starting speed or torque ratio and a desired/target speed or torque ratio, with the target ratio being the particular ratio required for the next-requested shift in the change-of-mind shift. The controller 50 may execute step S106 by measuring the primary and secondary speeds $\omega_P$ and $\omega_S$, respectively, and then calculating the starting speed ratio as the current speed ratio as disclosed above, i.e., $$R_{SR} = \frac{\omega_S}{\omega_P}.$$

The target speed ratio may be a calibrated speed ratio for the next-requested (op shift based on the torque request and other values in the control input signals (arrow CC$_I$). The method 100 proceeds to step S108 when the starting speed ratio and the target speed ratio have been determined.

At step S108, the controller 50 next determines the input acceleration profile to be applied during the change-of-mind shift detected at step S102. The profile, as explained above with reference to FIGS. 2-7, consists of multiple acceleration and time values that together define the shape of the acceleration profile, including the trajectories of any changes in acceleration of the input member 13 during the change-of-mind shift. Specifically, step S108 entails accessing the calibration map 40 of FIG. 1, which are indexed or referenced by the starting and target speed ratios determined at step S106, and extracting the required parameters for building the input acceleration profile.

As noted above, each parameter defining the acceleration profile may be extracted from the calibration map 40, which may be embodied as a three-dimensional calibration map. The first axis of the calibration map 40 in such an embodiment is the current or starting CVT speed ratio, with "current" and "starting" being not necessarily the same value. That is, in some embodiments it may be desirable to start onset of the acceleration profile at a different ratio than the current ratio. The second axis of the calibration map 40 is the desired speed or torque ratio, i.e., the target ratio for the change-of-mind shift, or the second or subsequent shift in a sequence. The third axis of the calibration map 40 is the acceleration or time value determining each of the acceleration trajectories.

Engine torque management, i.e., trace TM of FIG. 2, which may be necessary to compensate for inertia torque produced by acceleration of a turbine or other input member 13 in some shifts, is directly related to the acceleration profile and engine inertia as noted above. A request for such torque management is transmitted by the torque request module 51 of the controller 50 as the engine torque request (arrow 11) as explained above with reference to FIG. 1.

As part of step S108, the controller 50 may also identify the type of change-of-mind shift, such as a stacked upshift or downshift, a power down-to-coast down shift, or coast down-to-power down shift, or direction-change shifts such as upshift-to-downshift or downshift-to-upshift, i.e., a shift in which the direction of the gear state transition for the initially-requested shift is opposite that of the next-requested shift. The controller 50 can use the starting acceleration with any applied torque management as the initial value for the acceleration profile.

Also, the initial time $t_i$ may be modified in step S108 based on the initial acceleration value $a_i$. Thus, the controller 50 may determine the sign or direction of the change-of-mind shift, and then modify a trajectory of a portion of the acceleration profile when the change-of-mind shift is a same-direction shift or a change-of-direction shift. For instance, the controller 50 may shorten or lengthen the initial-to-maximum time duration relative to the initially-requested shift by a calibrated amount, e.g., as a calibration factor determined as function of the initial acceleration $a_i$ depending on the direction or "sign" of the shift. For same-sign/direction shifts, the initial time $t_i$ can be shortened relative to a regular step shift by a calibrated amount, while the initial time can be lengthened for a change-of-direction shift relative to the regular shift.

Step S110 includes converting the acceleration profile from step S106 into a corresponding required speed or torque ratio, for instance by calculating the required ratio using the calculations set forth above with reference to FIG. 2. The controller 50 then commands the clamping pressure (arrow P$_C$) of the variator assembly shown in FIG. 1 to thereby achieve the calculated required ratio.

Step S110 may entail delaying onset of the acceleration profile to account for response time of the engine 12 during periods of torque management. That is, once the change-of-mind shift initiates and is in a different direction relative to the initially-requested shift, the acceleration profile, determined at step S108, may be delayed by a calibrated duration. Delay is needed to properly synchronize the shift to the desired ratio, input acceleration, inertia torque calculation, and engine torque reduction, as well as known CAN bus or other communication delays. Such a delay, which may be determined as the sum of the known CAN bus and torque reduction time response, enables the applied acceleration profile to be properly synchronized with the torque management response, which may further optimize the quality of the change-of-mind shift.

While the best modes for carrying out the present disclosure have been described in detail, those familiar with the art to which this disclosure pertains will recognize various alternative designs and embodiments may exist that fall within the scope of the appended claims.

The invention claimed is:

1. A continuously variable transmission (CVT) for use with a torque generating mechanism, the CVT comprising:
   an input member connectable to the torque generating mechanism;
   an output member;

a variator assembly having an input pulley connected to the input member, an output pulley connected to the output member, and an endless rotatable drive element coupling the input and output pulleys; and a controller programmed to control a change-of-mind shift of the CVT, wherein the controller is programmed to detect a request for the change-of-mind shift, determine an acceleration profile of the input member for the requested change-of-mind shift using a calibration map indexed by a starting ratio and a target ratio of the variator assembly, calculate a required ratio of the CVT using the acceleration profile, and command a clamping pressure of the variator assembly to thereby achieve the calculated required ratio;

wherein the change-of-mind shift is a requested transition to a next-requested shift that initiates before completion of an initially-requested shift, and the starting ratio, target ratio, and required ratio are a speed ratio or a torque ratio.

2. The CVT of claim 1, wherein the starting ratio is an initial speed or torque ratio of the CVT when the change-of-mind shift is detected.

3. The CVT of claim 1, wherein the calibration map is populated with three time values and at least two acceleration values collectively defining the acceleration profile.

4. The CVT of claim 3, wherein the calibration map is populated with three acceleration values, including an initial acceleration of the input member for the initially-requested shift.

5. The CVT of claim 3, further comprising a speed sensor operable for measuring a speed of the input member, wherein the calibration map is populated with only two acceleration values and the controller is programmed to calculate an initial acceleration of the input member for the initially-requested shift using the measured speed.

6. The CVT of claim 1, wherein the controller is further programmed to selectively blend the acceleration profile of the input member with a torque management profile of the torque generating mechanism.

7. The CVT of claim 1, wherein the controller is further programmed to selectively modify a trajectory of a portion of the acceleration profile when the change-of-mind shift is a same-direction shift or a change-of-direction shift, including shortening an initial time period for achieving a maximum acceleration of the input member for the same-direction shift and lengthening the time period for achieving the maximum acceleration of the input member for the change-of-direction shift.

8. The CVT of claim 1, wherein the controller is further programmed to automatically delay an application of the acceleration profile as the calculated required ratio when the change-of-mind shift is a change-of-direction shift, and wherein the delay is sufficient for synchronizing with a torque management profile of the torque transmitting mechanism.

9. A method for controlling a continuously variable transmission (CVT) having an input member and a variator assembly, and that is usable with a torque generating mechanism, the method comprising:

detecting a requested change-of-mind shift of the CVT;

determining an acceleration profile of the input member for the change-of-mind shift using a calibration map indexed by a starting ratio and a target ratio of the variator assembly;

calculating a required ratio of input and output pulleys of the variator assembly using the acceleration profile; and commanding a clamping pressure of the variator assembly to thereby achieve the calculated required ratio;

wherein the change-of-mind shift is a requested transition to a next-requested shift that initiates before completion of an initially-requested shift, and the starting ratio, target ratio, and required ratio are a speed ratio or a torque ratio.

10. The method of claim 9, wherein determining an acceleration profile includes using, as the starting ratio, an initial speed ratio of the CVT when the change-of-mind shift is detected.

11. The method of claim 9, wherein determining an acceleration profile includes extracting, from the calibration map, three time values and at least two acceleration values collectively defining the acceleration profile.

12. The method of claim 11, including extracting three acceleration values from the calibration map, including extracting an initial acceleration of the input member for the initially-requested shift.

13. The method of claim 11, wherein the CVT includes a speed sensor operable for measuring a speed of the input member, further comprising calculating, via the controller, an initial acceleration of the input member for the initially-requested shift using the measured speed, and wherein extracting at least two acceleration variables includes extracting a final acceleration and a maximum acceleration.

14. The method of claim 11, further comprising selectively blending the acceleration profile of the input member with a torque management profile of the torque generating mechanism.

15. The method of claim 11, further comprising selectively modifying a trajectory of a portion of the acceleration profile when the change-of-mind shift is a same-direction shift or a change-of-direction shift, including shortening an initial time period for achieving a maximum acceleration of the input member for the same-direction shift and lengthening the time period for achieving the maximum acceleration of the input member for the change-of-direction shift.

16. The method of claim 11, further comprising automatically delaying onset of the acceleration profile when the change-of-mind shift is a change-of-direction shift, including delaying the onset for a duration that is sufficient for synchronizing with a torque management profile of the torque transmitting mechanism.

17. A vehicle comprising:

an engine;

an input member connectable to the engine;

an output member;

a variator assembly having an input pulley connected to the input member, an output pulley connected to the output member, and an endless rotatable drive element coupling the input and output pulleys; and a controller programmed to control a change-of-mind shift of a CVT having the variator assembly, wherein the controller is programmed to detect a request for the change-of-mind shift, determine an acceleration profile of the input member for the requested change-of-mind shift using a calibration map indexed by a starting ratio and a target ratio of the variator assembly and populated with three time values and at least two acceleration values collectively defining the acceleration profile, calculate a required ratio of the CVT using the acceleration profile, and command a clamping pressure of the variator assembly to thereby achieve the calculated required ratio;

wherein the change-of-mind shift is a requested transition to a next-requested shift that initiates before completion of an initially-requested shift, and the starting ratio, target ratio, and required ratio are a speed ratio or a torque ratio.

18. The vehicle of claim 17, wherein the controller is programmed to selectively modify a trajectory of a portion of the acceleration profile when the change-of-mind shift is a same-direction shift or a change-of-direction shift, including shortening an initial time period for achieving a maximum acceleration of the input member for the same-direction shift and lengthening the time period for achieving the maximum acceleration of the input member for the change-of-direction shift.

19. The vehicle of claim 17, wherein the controller is programmed to selectively automatically delay onset of the acceleration profile when the change-of-mind shift is a change-of-direction shift, including delaying the onset for a duration that is sufficient for synchronizing with a torque management profile of the torque transmitting mechanism.

* * * * *